Dec. 5, 1939.                L. G. COPEMAN                2,182,116
        PORTABLE BEVERAGE CONDITIONING AND DISPENSING APPARATUS
                   Filed Jan. 11, 1935         4 Sheets-Sheet 1
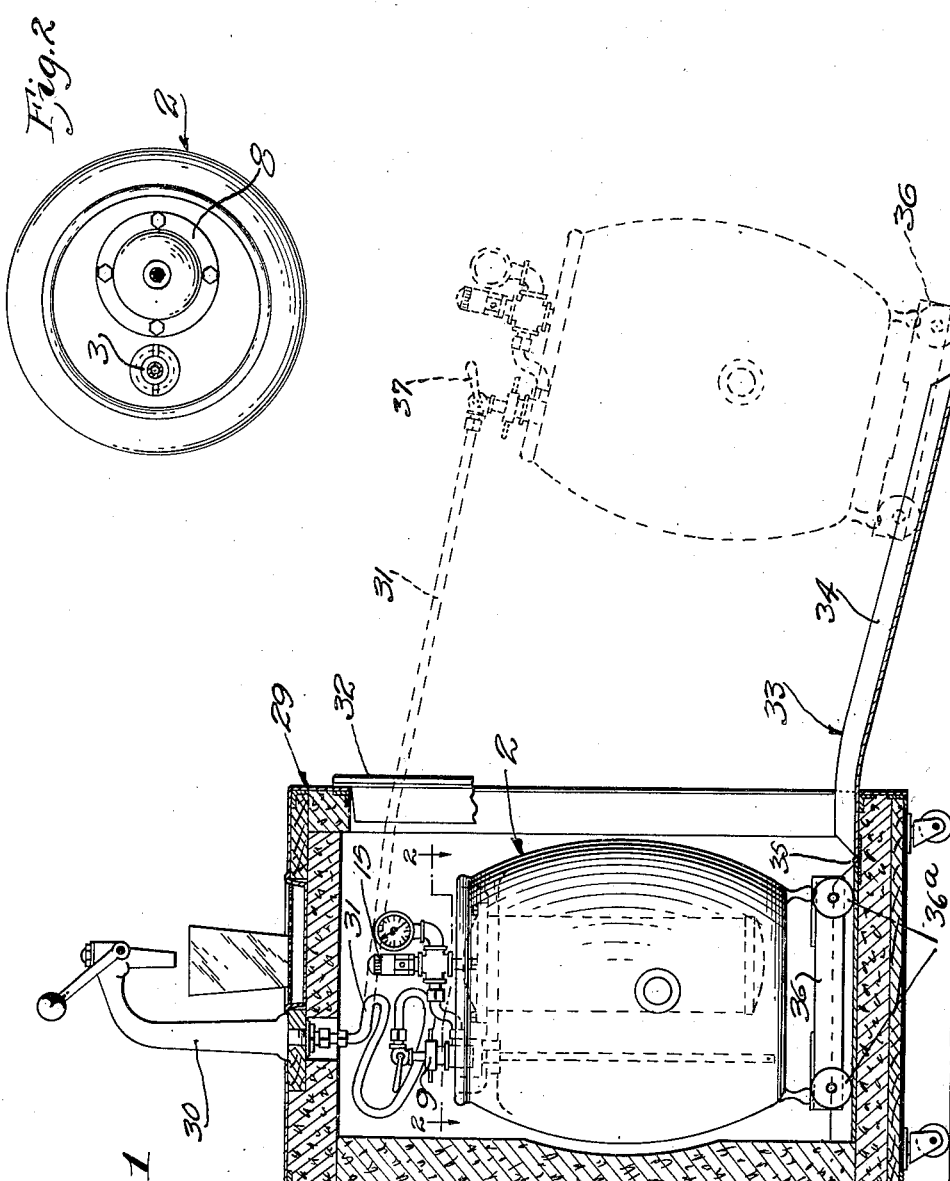
INVENTOR.
Lloyd G. Copeman
BY
Barnes, Kisselle, Laughlin & Raisch
ATTORNEYS

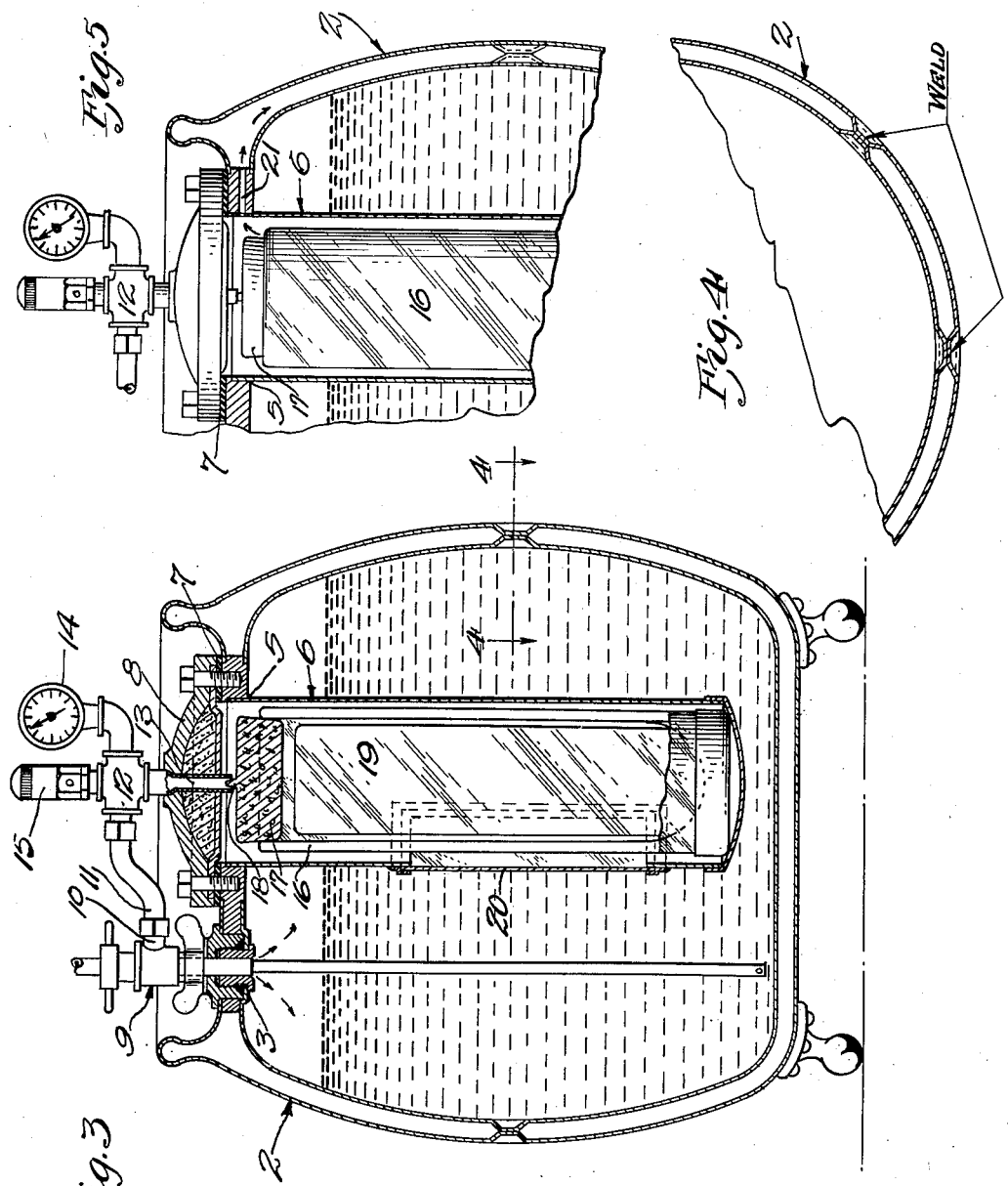

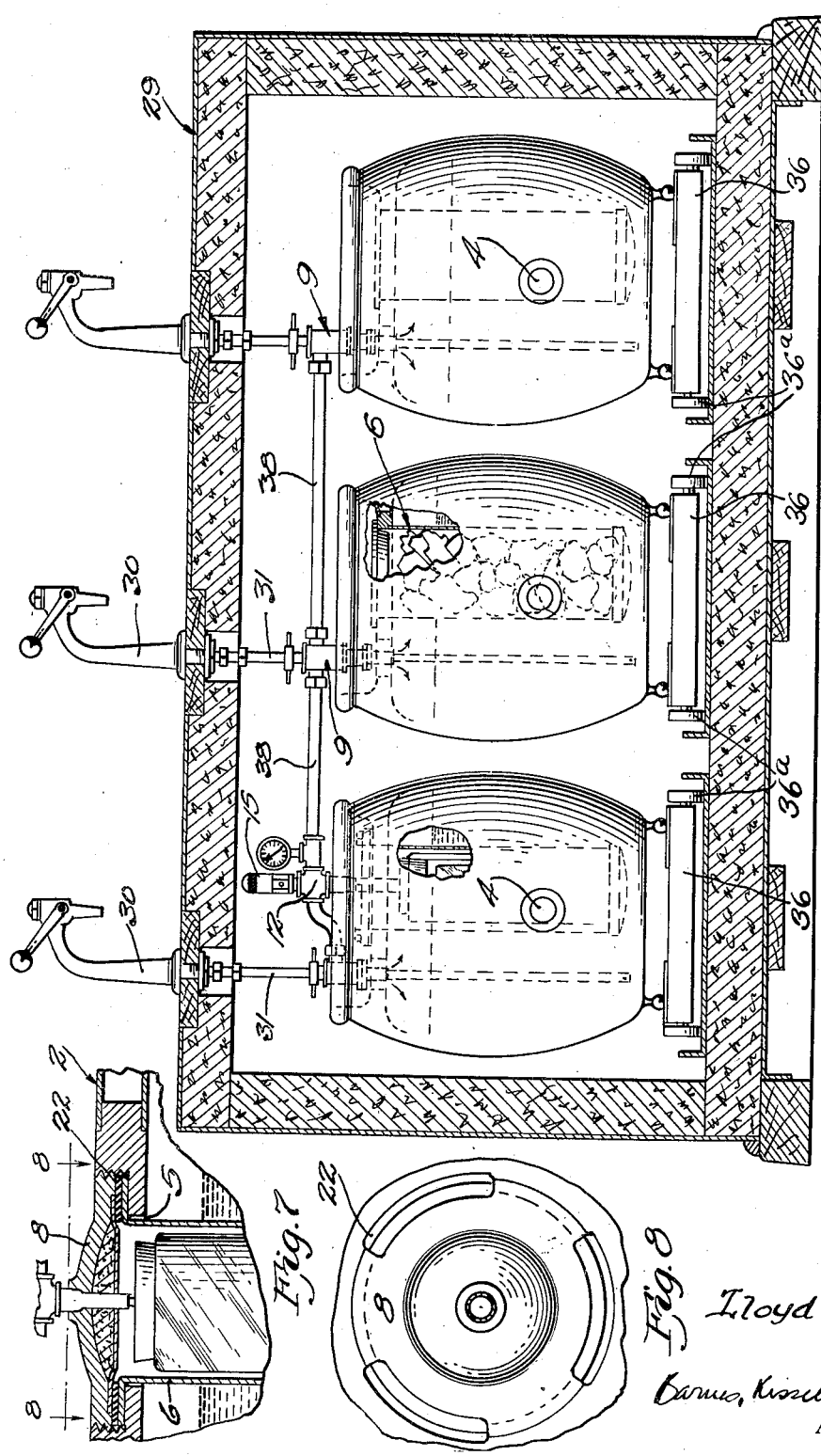

Dec. 5, 1939.  L. G. COPEMAN  2,182,116
PORTABLE BEVERAGE CONDITIONING AND DISPENSING APPARATUS
Filed Jan. 11, 1935  4 Sheets-Sheet 4

INVENTOR.
Lloyd G. Copeman
BY
Barnes, Kisselle, Laughlin & Raisch
ATTORNEYS.

Patented Dec. 5, 1939

2,182,116

UNITED STATES PATENT OFFICE 2,182,116

PORTABLE BEVERAGE CONDITIONING AND DISPENSING APPARATUS

Lloyd G. Copeman, Flint, Mich., assignor to Copeman Laboratories Company, Flint, Mich., a corporation of Michigan Application January 11, 1935, Serial No. 1,306

9 Claims. (Cl. 62—91.5)

This invention relates to a portable beverage conditioning and dispensing apparatus, and more particularly to portable beer barrels of the type wherein the beer is cooled within and dispensed directly from the barrel without passing through any auxiliary cooling apparatus.

As disclosed by the patents to Rennerfelt No. 456,161 and Baroch No. 798,942, attempts have heretofore been made to design individual beer barrels or apparatus for dispensing therefrom whereby the beer barrel acts as its own portable bar. However, I believe most of these attempts in the past have been highly impractical or embodied structure which violate the existing revenue laws with respect to the containing and dispensing of beer.

It is an object of the present invention to provide a self-contained portable beer barrel which serves as its own bar or which can be used in combination with an insulating container as its own bar. The ordinary apertures, namely the bung hole and the tapping aperture for the tap rod are retained exactly the same as in standard practice in beer barrels whether made of wood or metal.

More specifically, the present invention relates to the use of a cooling medium, preferably solid $CO_2$, which is so immersed with respect to the contents of the barrel that the transmission of heat units is direct by conduction; the container for the cooling medium being such as to maintain the contents of the barrel at a predetermined desired temperature, above freezing. A further object of the invention includes a cooling unit container immersible directly in the contents of the barrel, said container being removable to afford easy access for pitching and or cleaning the interior of the barrel, the aperture of the barrel for receiving the cooling medium being so fabricated as to require the use of considerable pressure at the brewery or filling station so that such container, while removable at the brewery or other source of supply, is nevertheless a permanent part of the barrel when shipped to the retailer or dispenser.

Further specific features include the novel insulated bar construction including means for easy loading and unloading of the beer barrel within the cabinet and the utilization of the released $CO_2$ gas to insulate and cool or precool barrels within the cabinet. The container, while permanently a part of the barrel outside of the brewery, has a top which is removable to permit loading the container with a cooling medium at the same time. In other words, the liquid contents can be precooled during shipping with any kind of cooling medium and upon arrival or upon time for use the container can be filled with solid $CO_2$ to obtain the desired carbonization of the liquid and correct precooling thereof.

Other features include the various structural details of the barrel, the accessories therefor, and the cabinet bar, together with the locating of the cooling medium to one side of the axis of the barrel whereby to promote a positive circulation of the contents, as will be more specifically brought out in the specification and claims.

In the drawings:

Fig. 1 is a vertical sectional view illustrating one embodiment of the invention wherein the portable beer barrel with the cooling, conditioning and dispensing mechanism is formed as a part thereof and disposed within a barrel or container, the portable feature of the bar being illustrated in dotted lines.

Fig. 2 is a plan view taken on line 2—2 of Fig. 1 illustrating the relative positions of the tap rod and the cooling unit.

Fig. 3 is a vertical sectional view of the self-contained portable barrel shown in Fig. 1, illustrating in detail the cooling, conditioning and dispensing structure.

Fig. 4 is a sectional view taken on line 4—4 of Fig. 3.

Fig. 5 is a fragmentary sectional view illustrating a slightly modified form of structure shown in Fig. 3, wherein a portion of the escaping $CO_2$ is used as a cooling and insulating means between the two shells of a metal barrel.

Fig. 6 is an elevation, partly in section, of the combination of a plurality of units embodying the present invention, one of said units being adapted to receive the solid $CO_2$ as a conditioning and cooling medium, said solid $CO_2$ supplying the conditioning medium for the other barrels which may be cooled by ice or other cooling medium other than $CO_2$.

Figs. 7 and 8 are fragmentary vertical sectional and plan views, respectively, of one form of cooling unit container wherein the cap for the cooling unit container has a bayonet slot relationship with the top of the barrel whereby to hold the container in fixed position.

Figure 9:
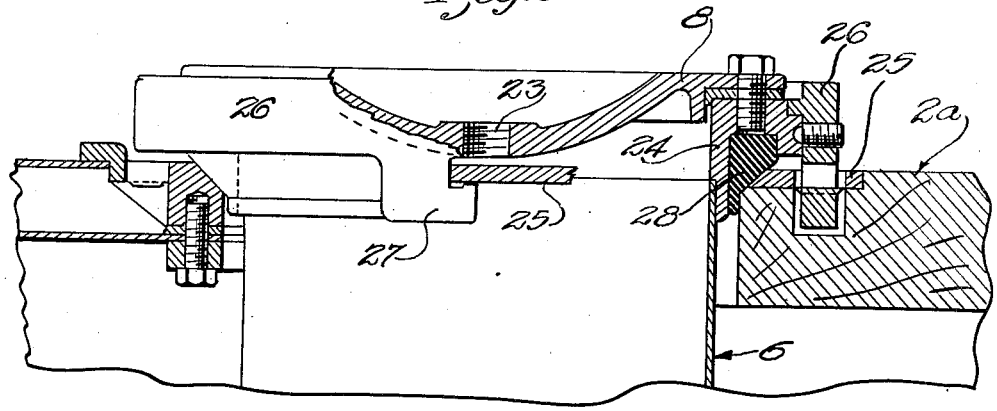
Fig. 9 is an enlarged sectional fragmentary view illustrating the preferred form of removable container and barrel construction.

The present invention deals particularly with that type of dispensing unit wherein the liquid is conditioned, cooled and dispensed directly from the portable container itself. The present invention is illustrated as being embodied in a conventional type of beer barrel, metal or wood, but it will be understood that it is readily adaptable to many different types of containers. The laws of the United States are somewhat exacting as to the manner in which the revenue stamp is placed upon the container, and where the beer is to be dispensed directly from the barrel this becomes quite a problem. My portable self-conditioning and self-cooling and dispensing unit utilizes a standard tap opening of a barrel as a dispensing opening and thus the placing of the revenue stamp over such tap opening complies with the laws the same as any standard beer barrel. As far as the source of conditioning and cooling supply is concerned, this is tamper proof as regards the unlawful removing or adding of any beer to the container.

A conventional metallic type of beer barrel is shown as at 2 in Fig. 3. This barrel may be provided with a standard tap opening 3 and standard bung 4. The top of the standard barrel may be apertured as at 5 to receive and support a solid $CO_2$ container cylinder 6. A gasket 7 separates the top of the opening 5 from a cover member 8 adapted to be securely clamped in place by suitable bolts.

A tap rod unit 9 is of standard construction with the exception that a check valve is provided at the point 10 and a conduit 11, instead of being connected to a source of air or $CO_2$ tank supply, is connected to a union 12. From this union 12 extends a conduit 13 down into the top of the container 6, a second conduit leading to a gauge 14, and a third conduit leading to a relief valve 15.

The container 6 may be directly filled with solid $CO_2$ or ice, but I prefer to use some form of insulating container 16, such as a vacuum container. A plug 17 may be fitted into the top of the container 16 and provided with a small extension 18 which permits the plug to be moved upwardly by the pressure of the $CO_2$ gas from the solid cake 19 of $CO_2$. The relief valve 15 may be set at, say, ten pounds, or any other desired pressure so that ten pounds or any other predetermined pressure will be maintained above the body of liquid in the barrel. The thickness of the vacuum container 16 or the insulating effect on all the walls within and including the container is preferably such that the beer be maintained at the proper temperature, above freezing. One wall of the container 6 is preferably provided with a glass side opening 20 which makes it possible, when one is filling the solid $CO_2$ container, to look through this glass opening and readily perceive the amount of liquid left in the barrel.

In the modification shown in Fig. 5 I have provided a small opening 21 in the upper part of the barrel, which opening is directly connected to the interior of the container 6. In this manner some of the $CO_2$ delivered from the container 16 will enter into and fill the hollow walls of the barrel. This $CO_2$ provides an excellent insulating medium.

In the modification shown in Figs. 7 and 8, the opening 5 in the upper wall of the barrel is offset and the offset portion threaded as at 22. The upper portion of the container 6 is flanged so as to be supported by the offset portion of the opening 5. The cap member 8 is also threaded as best shown in Fig. 7, and both the threaded portion 22 of the barrel and the threaded portion of the cap member are cut away or spaced apart so that threaded portions of the cap member 8 may be moved downwardly in between spaced apart portions of the threads 22, pressure applied to the cap member 8 to compress the gasket and align the threads, and the cap member then given a turn whereby the threaded portions mesh and securely hold the cap member in place.

Figure 10:
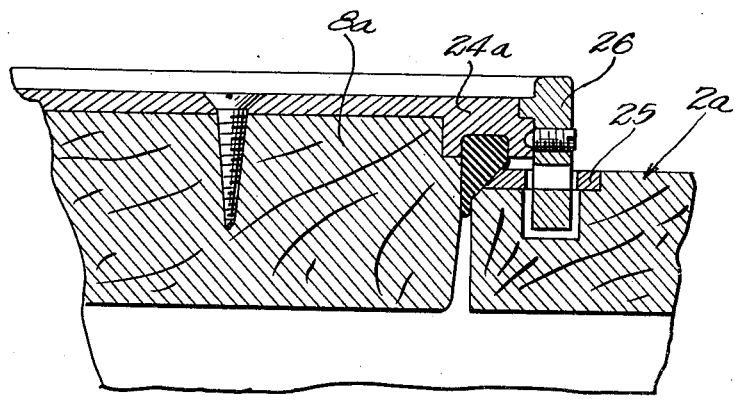
Fig. 10 is a sectional view similar to Fig. 9 but showing the removable container as being replaced by a dummy head.
Figure 11:
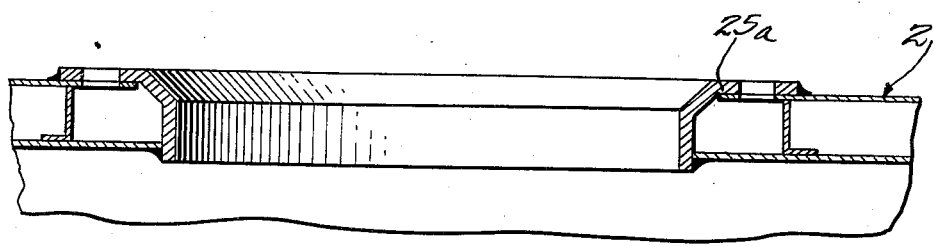
Fig. 11 is a fragmentary sectional view illustrating a preferred form of aperture construction when my removable container is used in connection with a steel barrel.

The preferred structure and manner of securing the cap in place is best shown in Figs. 9, 10 and 11. Here a wooden barrel is generally designated as at 2a and a metal barrel as at 2. In Fig. 9 the cap or head 8 is shown tapped as at 23 so as to receive a conduit 13, such as shown in Fig. 3. A ring 24 is welded to the top of the container 6. An apertured locking ring 25 is secured to the top of the barrel and a second locking ring 26 is secured to the ring 24. The ring 26 is provided with downwardly extending projections 27 adapted to, upon the application of downward pressure upon the cap 8, pass under and lock to the ring 25. A compression gasket 28 separates the rings 24 and 25.

In the modification illustrated in Fig. 10, the separate head 8 is dispensed with and the ring 24 is replaced with a circular plate 24a the periphery of which is similar to the structure of the ring 24. The plate 24a carries a head 8a which is used to seal the barrel when the container is not being used. In the modification shown in Fig. 11, the ring 25 is shown as being replaced by a different type but similarly acting ring 25a which is welded to the top of a metal barrel. The application of the sealing gasket 28 and the rings 24 and 26 to the top of the metal barrel as shown in Fig. 11 is the same as illustrated in Fig. 9.

In assembling the container within the barrel as shown in Fig. 9 or in merely closing the top of the barrel as shown in Fig. 10, the compression gasket 28 is compressed under great pressure applied to the top of the ring 24. The locking ring 27 is then revolved to locking position, as best illustrated in Fig. 9, and pressure on the top of the ring 24 is then relieved causing the locking rings 25 and 27 to interengage and seal the container 6 to the barrel head. The vertical spacing of the locking means 25 and 27 is such that considerable pressure is required to compress the gasket 28 and cause interengagement of these two rings so that this sealing of the container 6 within the barrel can only be accomplished at the brewery or other qualified dispensary where the heavy pressure required will be available. The head 8 may then be applied or removed as desired, as this only admits entrance to the container 6 and does not permit entrance to the liquid contents of the barrel. It will be obvious that the barrel may be filled at the brewery without removing the container 6, but it is customary to repitch the interior of beer barrels substantially at every refilling. By removing the container 6 from the barrel at the brewery, it will be possible to make an easy and complete inspection of the inside of the barrel to see if the same requires repitching, and the large opening also makes it possible to easily repitch the barrel if required.

From the above it will be seen that a barrel with standard filling and dispensing apertures can be made a self-dispensing unit. However, to give my self-conditioning, self-cooling and dispensing barrel a more pleasing appearance and, at the same time, to greatly increase the efficiency of the entire unit, as best shown in Fig. 1, I have provided a bar 29 with a standard type draft arm 30 which is connected to the upper end of the tap rod 9 by means of a flexible tubing 31. Thus the draft arm 30 merely forms an extension of the tap rod 9. It will be understood that in cases where the beer barrel is used as a self-dispensing bar without the outer enclosing unit, that the dispensing valve will be placed at the upper end of the tap rod.

The bar 29 consists in general of an insulated cabinet with a door 32. This cabinet is provided with a foldable track generally designated 33 which consists of two spaced angle irons 34 hinged to the bottom of the cabinet as at 35 so that the track may be folded into upright position, the barrel protruding between the spaced angle irons 34 so that when the barrel is in the position shown in Fig. 1, the track may be folded into upright position and the door 32 closed. A car or truck 36 having wheels 36a is provided for the barrel and adapted to run on the track 33. To make use of the foldable track, the barrel is tapped in the usual manner and the conduit 31 attached to the tap rod. The valve 37 may then be turned on and the barrel moved from the position shown in dotted lines in Fig. 1 to the position shown in solid lines.

The solid $CO_2$ container 6 may be filled at the brewery before the shipment of the barrel, in which case the beer will be cooled and fully charged upon delivery, or the solid $CO_2$ may be inserted in the container at the time of delivery or just before the barrel is placed in the bar unit 29, or just before the beer is dispensed directly from the barrel. In either case, when the beer container is placed within the bar unit 29, the gaseous $CO_2$ will almost immediately start to escape from the valve 15 because of the fact that the valve 15 is set for only ten to twenty pounds. The escaping $CO_2$ gas cools the inside of the insulated bar 29 and also fills all the interstices of the insulation and thus greatly increases the insulating qualities of the insulating material; some of the $CO_2$ gases, of necessity, will have to leak through the bar unit but, at the same time, the interior of the bar unit will be kept at a relatively low temperature by the escaping $CO_2$ gas. The unit is therefore not only self-conditioning and self-dispensing, but it eliminates the use of cold storage rooms.

As best shown in Fig. 6, the bar unit 29 may be increased in size to take care of a multiple installation. In this case the front of the bar unit may be provided with a plurality of doors 32 instead of just one and each barrel may be tapped in the ordinary manner and directly connected to a draft arm 30. In such a multiple installation, each barrel may be provided with an independent charge of dry $CO_2$ or, if desired, only one barrel need be charged with a supply of solid $CO_2$, and the union 12 of this barrel may be connected by means of a conduit 38 with the tap rods 9 of the other barrels. In this instance the relief valve 15 will serve as a relief valve for predetermining the pressure in all three barrels. Gaseous $CO_2$ discharged into the union 12 will be conducted to the upper end of each of the tap rods in each barrel and such gaseous $CO_2$ discharged directly into the barrel above the surface of the liquid, as shown by the arrows in Fig. 6. The container 6 in the other two barrels, as shown in Fig. 6, may be filled with cracked ice to assist in maintaining the correct temperature of beer in said other two barrels; the solid $CO_2$ providing all the cooling from one barrel and all the $CO_2$ for charging the beer and dispensing the same from all the barrels. The surplus $CO_2$ gas over that required in the conditioning and dispensing of beer from the barrels will escape into and be largely retained within the walls of the bar unit to increase the cooling and insulating effect thereof.

What I claim is:

1. A dispensing, conditioning and cooling unit for beer and the like, comprising a main container for receiving a body of liquid to be conditioned and dispensed, a solid $CO_2$ container positioned within said main container, a dispensing conduit leading from said main container, a single means for controlling the escaping of the $CO_2$ gases from the $CO_2$ container to the main container and for maintaining a predetermined pressure of the $CO_2$ gases within the main container and releasing the remainder of the $CO_2$ gases to a point outside the main container, and a container surrounding the entire unit and confining a portion of the escaping $CO_2$ gases around the same whereby to maintain a cold storage compartment for the unit.

2. A dispensing, conditioning and cooling unit for beer and the like, comprising a main container for receiving a body of liquid to be conditioned and dispensed, a solid $CO_2$ container positioned within said main container, a dispensing conduit leading from said main container, a single means for controlling the escaping of the $CO_2$ gases from the $CO_2$ container to the main container and for maintaining a predetermined pressure of the $CO_2$ gases within the main container and releasing the remainder of the $CO_2$ gases to a point outside the main container, and an insulating container surrounding the entire unit and confining a portion of the escaping $CO_2$ gases around the same whereby to maintain a cold storage compartment for the unit, said $CO_2$ gases filling the pores of said container and increasing the insulating effect thereof.

3. A dispensing, conditioning and cooling unit for beer and the like, comprising a main container for receiving a body of liquid to be conditioned and dispensed, a solid $CO_2$ container positioned within said main container, a dispensing conduit leading from said main container, a single means for controlling the escaping of the $CO_2$ gases from the $CO_2$ container to the main container and for maintaining a predetermined pressure of the $CO_2$ gases within the main container and releasing the remainder of the $CO_2$ gases to a point outside the main container, an insulating container surrounding the entire unit and confining a portion of the escaping $CO_2$ gases around the same whereby to maintain a cold storage compartment for the unit, said $CO_2$ gases filling the pores of said container and increasing the insulating effect thereof, and dispensing means on the outside of said insulated container and connected to the dispensing conduit leading from said main container.

4. A cooling and dispensing unit for beer and the like, comprising a container for receiving a body of liquid to be cooled and dispensed, a second container for receiving a body of solid $CO_2$, means for conducting $CO_2$ gases into the main container, a cover removable to permit access to the $CO_2$ container from the outside, a portion of the wall of said $CO_2$ container being formed of transparent material.

5. A cooling and dispensing unit for beer and the like, comprising a container for receiving a body of liquid to be cooled and dispensed, a second container for receiving a body of solid $CO_2$, means for conducting $CO_2$ gases into the main container, a cover removable to permit access to the $CO_2$ container from the outside, a portion of the wall of said $CO_2$ container being formed of transparent material of relatively great height whereby to indicate the height of the liquid within the second container upon renewal of the solid $CO_2$ in the $CO_2$ container.

6. A dispensing, conditioning and cooling unit for beer and the like, comprising a main container for receiving a body of liquid to be conditioned and dispensed, a tap rod opening and a tap rod extending within the container, a cooling container supported by and extending within the liquid within the main container, a portion of the cooling container cooperating with a portion of the liquid container whereby to lock the cooling container in place, said cooperating parts requiring relatively great pressure before said parts assume said locking relation whereby to prevent access to the liquid contents of the container except through the tap rod opening.

7. A dispensing, conditioning and cooling unit for beer and the like, comprising a main container for receiving a body of liquid to be conditioned and dispensed, a tap rod opening and a tap rod extending within the container, a relatively large opening in the container for receiving a cooling container, a cover member for said opening and a portion of the cover member cooperating with a portion of the main container whereby to lock the cover in place, a gasket between said cover member and main container.

8. In a dispenser of the character described, a heat insulating case, a liquid container housed within the case, said case normally providing an enclosed space above and about the sides of said container, a conduit leading through the case and container structures for tapping said container, a receptacle for solid carbon dioxide disposed within the container, a conduit leading from said receptacle to said enclosed space for releasing gas into said space, and a conduit leading from said last named conduit to the interior of said container for releasing gas into the top of said container.

9. In a dispenser of the character described, a heat insulating case, a liquid container housed within the case, said case normally providing an enclosed space above and about the sides of said container, a conduit leading through the case and container structures for tapping said container, a receptacle for solid carbon dioxide disposed within the container, a conduit leading from said receptacle to the outside of said container for releasing gas into said enclosed space within the case, and a conduit leading from said last named conduit into the said container for releasing gas from said receptacle into said container.

LLOYD G. COPEMAN.